United States Patent [19]

O'Malley

[11] 4,157,046
[45] Jun. 5, 1979

[54] FOUR SPEED POWER TRANSMISSION WITH OVERDRIVE

[75] Inventor: John J. O'Malley, Ann Arbor, Mich.

[73] Assignee: General Motors Corporation, Detroit, Mich.

[21] Appl. No.: 895,630

[22] Filed: Apr. 12, 1978

[51] Int. Cl.² ............................................. F16H 57/10
[52] U.S. Cl. ........................................ 74/763; 74/753
[58] Field of Search ................ 74/763, 767, 759, 753

[56] References Cited
U.S. PATENT DOCUMENTS

| 3,354,752 | 11/1967 | General et al. ....................... 74/763 |
| 3,418,871 | 12/1968 | Cartwright et al. ................... 74/763 |
| 3,523,468 | 8/1970 | Kepner ............................... 74/763 X |
| 3,797,332 | 3/1974 | Cameron et al. ..................... 74/763 |
| 4,027,551 | 6/1977 | Murakami et al. .................... 74/759 |
| 4,056,990 | 11/1977 | Hatano .............................. 74/759 X |

Primary Examiner—Lance W. Chandler
Attorney, Agent, or Firm—Donald F. Scherer

[57] ABSTRACT

A power transmission, having three interconnected simple planetary gear sets, two friction clutches and three friction brakes operable to establish two underdrive forward ratios, a direct forward ratio, an overdrive forward ratio and a reverse ratio, is provided for use in a motor vehicle.

3 Claims, 1 Drawing Figure

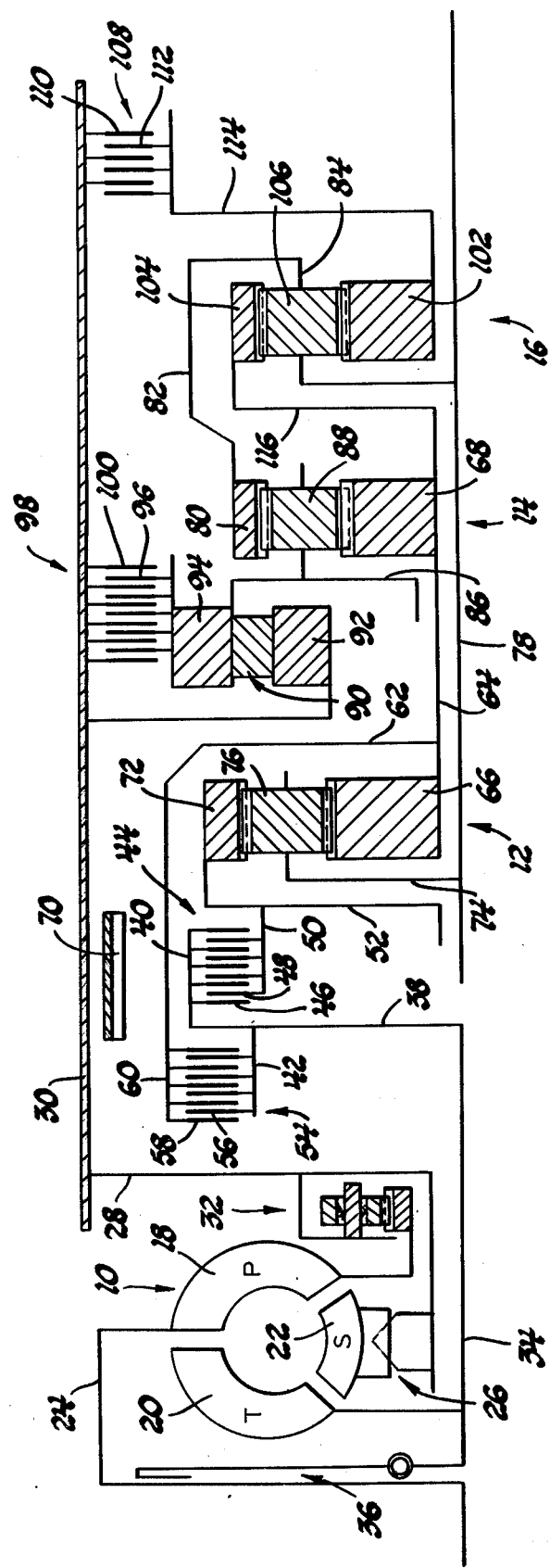

FOUR SPEED POWER TRANSMISSION WITH OVERDRIVE

This invention relates to power transmissions and more particularly to power transmissions having an overdrive ratio.

It is an object of this invention to provide an improved power transmission wherein four forward speeds including an overdrive drive ratio are provided.

Another object of this invention is to provide an improved power transmission having three interconnected simple planetary gear sets selectively controlled by clutches and brakes to provide a reverse ratio, two forward underdrive ratios, a direct forward ratio and an overdrive forward ratio.

A further object of this invention is to provide an improved power transmission having three interconnected simple planetary gear sets selectively controlled by clutches and brakes to establish four forward speed ratios wherein an overdrive ratio is established, during one ratio, by compounding the reaction load between two of the planetary gear sets.

Still another object of this invention is to provide an improved power transmission having three simple planetary gear sets wherein the sun gears of the first and second sets and the ring gear of the third set are interconnected and selectively connectable with an input clutch, held stationary by a brake or allowed to rotate freely, the carriers of the first and third sets and the ring gear of the second set are connected to the transmission output, the ring gear of the first set is selectively connectable with another input clutch and the carrier of the second set and the sun gear of the third set can each be selectively held stationary.

These and other objects and advantages will be more apparent from the following description and drawing which is a schematic representation of the power transmission.

Referring to the drawing there is seen a torque converter, generally designated 10, a first planetary gear set, generally designated 12, a second planetary gear set, generally designated 14, and a third planetary gear set, generally designated 16. The torque converter 10 has an impeller 18, a turbine 20 and a stator 22 connected in conventional toroidal flow. The torque converter 10 may be constructed in accordance with an conventional manufacturing methods. The impeller 18 is connected to an input shell 24 which is adapted to be connected to an internal combustion engine, in a conventional manner, and to a conventional internal-external type gear pump generally designated 32. The stator 22 is connected to, a one way device generally designated 26 which in turn is connected through a wall or hub 28 to the transmission housing 30. The turbine 20 is connected to a transmission input shaft 34 and is also connected to a converter lock-up clutch 36, which lock-up clutch may be constructed in accordance with U.S. Pat. No. 3,252,352 or any of the other well known lock-up clutch constructions.

The transmission input shaft 34 is connected to a hub 38 which has formed thereon a pair of clutch hubs 40 and 42. The clutch hub 40 forms a part of the forward clutch, generally designated 44, which has a plurality of interleaved friction plates 46 and 48. The plates 46 are splined to hub 40, while the plates 48 are splined to a clutch drum 50 which is connected to an output hub 52. The clutch 44 has incorporated therein a piston, not shown, which is preferably fluid operated to selectively engage the friction plates 46 and 48 thereby connecting hub 52 to the transmission input shaft 34.

The hub 42 is a component in a direct-reverse clutch, generally designated 54, which is comprised of interleaved friction plates 56 and 58 splined to hub 42 and a drum 60 respectively. The friction plates 56 and 58 are preferably selectively engaged by a fluid operated piston, not shown. The drum 60 is connected to a shell 62 which in turn is connected to a sun gear shaft 64 interconnecting the sun gears 66 and 68 which are components of planetary gear sets 12 and 14 respectively. When the clutch 54 is engaged, the sun gears 66 and 68 are connected to shaft 34. A conventional fluid operated band brake 70 encircles the drum 60 and is preferably adapted to be selectively engaged by fluid pressure to restrain the drum 60 and therefore sun gears 66 and 68 from rotation.

The hub 52 is drivingly connected to a ring gear 72 which is a component in the planetary gear set 12, which planetary gear set 12 also includes a planet carrier 74 on which is rotatably mounted a plurality of planet pinions 76 meshing with the sun gear 66 and ring gear 72. The planet carrier 74 is drivingly connected to a transmission output shaft 78. When the clutch 44 is engaged, ring gear 72 is connected to shaft 34.

The planetary gear set 14 includes a ring gear 80 which is connected through a hub 82 and a planet carrier 84, of the planetary gear set 16, to the output shaft 78. The planetary gear set 14 also includes a planet carrier 86 on which is rotatably mounted a plurality of pinion gears 88 meshing with the sun gear 68 and the ring gear 80. The planet carrier 86 is connected to a one way device, generally designated 90, the inner race 92 of which is connected to the transmission housing 30 and the outer race 94 of which is connected through a spline connection to a plurality of brake plates 96. The brake plates 96 are a component in a fluid operated friction plate generally designated 98 which also includes brake plates 100 interleaved with plates 96 and splined to the transmission case 30 and selectively forced into friction engagement with the plates 96 by a fluid operated piston, not shown. The one way device 90 prevents rotation of carrier 86 in one direction, while the brake 98, when selectively engaged, prevent rotation of carrier 86 in both directions.

The planetary gear set 16 includes a sun gear 102, a ring gear 104, the planet carrier 84 and a plurality of planet pinions 106 which are rotatably mounted on the carrier 84 and mesh with the sun gear 102 and ring gear 104. The sun gear 102 may be selectively connected to the transmission housing 30 by a conventional fluid operated brake, generally designated 108.

The brake 108 includes interleaved plates 110 and 112 which are splined to the transmission housing 30 and a hub 114 which is drivingly connected to the sun gear 102. The brake 108 is preferably engaged by a fluid operated piston, not shown, in a well known manner. The ring gear 104 is drivingly connected through a hub 116 to the sun gear shaft 64.

The fluid operated friction clutches 44 and 54, and the fluid operated brakes 70, 98 and 108 are preferably, as previously mentioned operated by fluid engaged pistons. These clutches and brakes may be constructed in accordance with any of the well known principles of constructing clutches and brakes within automatic power transmissions. While these clutches and brakes are preferably operated by hydraulic fluid pressure they may also be operated by other means such as pneumatics or electrical power as is well known in the art. The transmission output shaft 78 is adapted to be connected in a conventional manner to the wheels of a vehicle such that a variable speed ratio interconnection is provided between the power source and the drive wheels of the vehicle.

The above described three planetary gear sets 12, 14 and 16 may be selectively controlled by the clutches and brakes to provide four forward speed ratios, including an overdrive ratio, and a reverse speed ratio. To establish the lowest gear ratio the forward clutch 44 is engaged thereby connecting the ring gear 72 with the transmission input shaft 34. The engagement of the clutch 44 results in an attempt to drive the sun gears 66 and 68 in a reverse direction which results in torque urging reverse rotation of the planet carrier 86. The carrier 86, because of the one way clutch 90, cannot rotate in a reverse direction, therefore the ring gear 80 rotates forwardly driving the output shaft 78 in a forward direction. The brake 98 may also be selectively engaged for the low drive ratio if engine braking during coast drive is desired.

To establish the second ratio, the brake band 70 is applied to the drum 60 thereby preventing the rotation of sun gear 66 such that planet carrier 74 and therefore output shaft 78 are driven forwardly at a greater speed ratio. If the brake 98 was engaged for the low ratio, it would be released for the second ratio.

The third forward speed ratio is established by disengaging brake band 70 while simultaneously engaging the direct clutch 54. This causes a locked up condition in the planetary gear sets and therefore a one to one ratio is obtained between the transmission input shaft 34 and the transmission output shaft 78.

To establish the fourth or overdrive forward speed ratio, the brake 108 is engaged while the direct clutch 54 is disengaged. With the brake 108 engaged the sun gear 102 is held stationary. Since the output shaft and therefore carrier 84 are being driven forwardly, the ring gear 104 must rotate forwardly. Since the carrier 84 is being driven the ring gear 104 will rotate in the same direction at a greater speed than the carrier 84 resulting in a speed greater than one to one in the sun gear 66. The speed of sun gear 66 and ring gear 72 are combined in planetary gear set 12 to drive the carrier 74 in a forward direction at a speed greater than the input speed of ring gear 72. Thus the output shaft 78 rotates faster than the input shaft 34. This is primarily accomplished by the compounding of the reaction of sun gear 66. In the overdrive ratio the sun gear 66 is one of the reaction components in the planetary gear sets 12 and 16 the other reaction member of course being sun gear 102 which is held stationary. Due to the forward rotation of sun gear 66 caused by the interconnection of the planetary gear sets 12 and 16, the overdrive ratio is possible with this combination of gear sets.

The reverse drive ratio is accomplished from starting at a neutral condition in which all clutches and brakes are disengaged and the direct reverse clutch 54 and brake 98 are engaged resulting in a forward rotation of sun gear 68 and the reverse rotation of ring gear 80, since the carrier 86 is held stationary by the brake 98.

Upshifting and downshifting in the forward direction can be accomplished in a conventional manner using conventional shift control valves as is well known in the art. The lock-up clutch 36 may be engaged in any forward or the reverse drive ratio which will result in an improvement in fuel economy since the inherent slip of the torque converter is removed from the drive system. However it is preferable to engage the lock-up clutch 36 only in the third and fourth forward ratios.

Obviously, many modifications and variations of the present invention are possible in light of the above teaching. It is therefore to be understood, that within the scope of the appended claims the invention may be practiced otherwise than as specifically described.

The embodiments of the invention in which an exclusive property or privilege is claimed, are defined herein as follows:

1. A power transmission for a wheeled vehicle having a prime mover comprising: input means adapted to be connected to the prime mover; output means adapted to be connected to drive wheels of the vehicle; first selectively operable friction clutch means drivingly connected to said input means; second selectively operable friction clutch means drivingly connected to said input means; three simple planetary gear means including first, second and third sun gears respectively, first, second and third ring gears respectively, first, second and third planet carrier means respectively, and pinion gears rotatably mounted on each of said carrier means meshing with the respective sun gear and ring gear; first drive means interconnecting said second clutch means, said first sun gear, said second sun gear and said third ring gear; second drive means interconnecting said first carrier means, said second ring gear means, said third carrier means and said output means; first brake means selectively operable to prevent rotation of said second carrier means in at least one direction; second brake means selectively operable to prevent rotation of said first drive means; and third brake means selectively operable to prevent rotation of said third sun gear; said first friction clutch means being connected to said first ring gear; said first clutch means and said third brake means being operated to condition said first and third planetary gear means to establish an overdrive ratio between said input and output means.

2. A power transmission for a wheeled vehicle having a prime mover comprising: input means adapted to be connected to the prime mover; output means adapted to be connected to drive the wheels of the vehicle; first selectively operable friction clutch means 12 drivingly connected to said input means; second selectively operable friction clutch means drivingly connected to said input means; three simple planetary gear means including first, second and third sun gears respectively, first, second and third ring gears respectively, first, second and third planet carrier means respectively, and pinion gears rotatably mounted on each of said carrier means meshing with the respective sun gear and ring gear; first drive means interconnecting said second clutch means, said first sun gear, said second sun gear and said third ring gear; second drive means interconnecting said first carrier means, said second ring gear means, said third carrier means and said output means; first brake means selectively operable to prevent rotation of said second carrier means in at least one direction; second brake means selectively operable to prevent rotation of said fist drive means; and third brake means selectively operable to prevent rotation of said third sun gear; said first friction clutch means being connected to said first ring gear; said first clutch means and said third brake means being operated in combination to condition said first and third planetary gear means to establish an overdrive ratio between said input and output means wherein the sun gear of the third planetary gear means is a stationary reaction member and the sun gear of the first planetary gear means is a rotating reaction member controlled in rotary speed proportional to the gear ratio established by the third planetary gear means.

3. A power transmission for a wheeled vehicle having a prime mover comprising: input means adapted to be connected to the prime mover; output means adapted to be connected to drive the wheels of the vehicle; a transmission housing; first selectively operable friction clutch means drivingly connected to said input means; second selectively operable friction clutch means drivingly connected to said input means; three simple planetary gear means including first, second and third sun gears respectively, first, second and third ring gears respectively, first, second and third planet carrier means respectively, and pinion gears rotatably mounted on each of said carrier means meshing with the respective sun gear and ring gear; first drive means interconnecting said second clutch means, said first sun gear, said second sun gear and said third ring gear; second drive means interconnecting said first carrier means, said second ring gear means, said third carrier means and said output means; first brake means selectively operable to prevent rotation of said second carrier means in at least one direction; second brake means selectively operable to prevent rotation of said first drive means; and third brake means selectively operable to prevent rotation of said third sun gear; said first friction clutch means being connected to said first ring gear; said first clutch means being operated to connect said ring gear of said first planetary gear means to said input means and said third brake means being operated to connect said sun gear of said third planetary gear means to said transmission housing to establish said sun gear of said third planetary gear means as a stationary reaction member and through said first drive means establishing said sun gear of said first planetary gear means as a rotating reaction member the rotation speed of which is controlled in proportion to the ratio of said third planetary gear means whereby an overdrive ratio is established beteen said input means and said output means by said first planetary gear means.

* * * * *

UNITED STATES PATENT AND TRADEMARK OFFICE
CERTIFICATE OF CORRECTION

PATENT NO. : 4,157,046

DATED : June 5, 1979

INVENTOR(S) : John J. O'Malley

It is certified that error appears in the above-identified patent and that said Letters Patent are hereby corrected as shown below:

Column 1, line 46, "an" should read -- any --.

Column 4, line 15, after "drive" insert -- the --.

Column 4, line 61, "fist" should read -- first --.

Signed and Sealed this

Sixteenth Day of October 1979

[SEAL]

Attest:

RUTH C. MASON
Attesting Officer

LUTRELLE F. PARKER
Acting Commissioner of Patents and Trademarks